United States Patent
Kim et al.

(10) Patent No.: US 8,260,069 B2
(45) Date of Patent: Sep. 4, 2012

(54) COLOR IMAGE ENCODING AND DECODING METHOD AND APPARATUS USING A CORRELATION BETWEEN CHROMINANCE COMPONENTS

(75) Inventors: So-young Kim, Yongin-si (KR); Jeong-hoon Park, Seoul (KR); Sang-rae Lee, Suwon-si (KR); Seung-ran Park, Hwaseong-si (KR); Yu-mi Sohn, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/107,051

(22) Filed: May 13, 2011

(65) Prior Publication Data

US 2011/0211757 A1    Sep. 1, 2011

Related U.S. Application Data

(62) Division of application No. 11/219,735, filed on Sep. 7, 2005, now Pat. No. 7,970,219.

(30) Foreign Application Priority Data

Dec. 30, 2004  (KR) ................. 10-2004-0116962
Apr. 2, 2005   (KR) ................. 10-2005-0027827

(51) Int. Cl.
*G06K 9/36* (2006.01)
(52) U.S. Cl. ......................................... 382/233
(58) Field of Classification Search ............... 382/233, 382/239
See application file for complete search history.

(56) References Cited

U.S. PATENT DOCUMENTS

| | | | |
|---|---|---|---|
| 5,363,097 A | 11/1994 | Jan | |
| 6,075,573 A | 6/2000 | Shyu | |
| 6,081,622 A | 6/2000 | Carr et al. | |
| 6,493,385 B1 * | 12/2002 | Sekiguchi et al. | 375/240.03 |
| 6,587,509 B1 * | 7/2003 | Suzuki et al. | 375/240.29 |
| 6,639,942 B1 | 10/2003 | Bayazit | |
| 6,785,425 B1 | 8/2004 | Feder et al. | |
| 2003/0138048 A1 | 7/2003 | Hall et al. | |
| 2004/0028282 A1 * | 2/2004 | Kato et al. | 382/236 |

(Continued)

FOREIGN PATENT DOCUMENTS

FR    2867327 A1    9/2005

(Continued)

OTHER PUBLICATIONS

Communication dated Jun. 23, 2011, issued by the Korean Intellectual Property Office in counterpart Korean Application No. 10-2005-0027827.

(Continued)

*Primary Examiner* — Matthew Bella
*Assistant Examiner* — Dennis Rosario
(74) *Attorney, Agent, or Firm* — Sughrue Mion, PLLC

(57) ABSTRACT

A color image encoding and decoding method and apparatus use a correlation between chrominance components in order to improve coding efficiency. The color image decoding method includes: transforming chrominance components of a color image in each of two or more inter-prediction modes, calculating costs for the conversion values in each of the two or more inter-prediction modes using a predetermined cost function, selecting one of the two or more inter-prediction modes based on the calculation result, and outputting conversion values of the selected inter-prediction mode; entropy encoding the output conversion values.

30 Claims, 14 Drawing Sheets

U.S. PATENT DOCUMENTS

| | | |
|---|---|---|
| 2004/0252897 A1 | 12/2004 | Hara et al. |
| 2006/0056627 A1 | 3/2006 | Linzer et al. |
| 2006/0146191 A1 | 7/2006 | Kim et al. |
| 2011/0150089 A1 | 6/2011 | Chujoh et al. |
| 2012/0033729 A1 | 2/2012 | Demos |

FOREIGN PATENT DOCUMENTS

| | | |
|---|---|---|
| JP | 2003169349 A | 6/2003 |
| KR | 1020040018444 A | 3/2004 |
| KR | 1020040028913 A | 4/2004 |
| KR | 1020040054602 A | 6/2004 |
| RU | 2073913 C1 | 2/1997 |
| WO | 9960793 A1 | 11/1999 |

OTHER PUBLICATIONS

European Patent Office, "European Search Report," issued in connection with European Patent Application No. 05257132.0, dated Jun. 22, 2007.

Schuster et al., "An Optimal Quadtree-Based Motion Estimation and Motion-Compensated Interpolation Scheme for Video Compression," pp. 1505-1523, vol. 7, No. 11, IEEE Transactions on Image Processing, Nov. 1998.

Bellifemine et al. "Energy Reduction vs. Overheads Increasing: An Optimal Selection Criterion," pp. 385-390, vol. 3, Digital Signal Processing, International Conference on Acoustics, Speech & Signal Processing in Toronto, Canada, May 14-17, 1991.

United States Patent and Trademark Office, "Non-Final Office Action," issued in connection with U.S. Appl. No. 11/219,735, filed Jul. 13, 2010.

United States Patent and Trademark Office, "Non-Final Office Action," issued in connection with U.S. Appl. No. 11/219,735, filed Oct. 20, 2010.

United States Patent and Trademark Office, "Notice of Allowance," issued in connection with U.S. Appl. No. 11/219,735, filed Feb. 14, 2011.

Communication issued on Jan. 17, 2012 by the Korean Patent Office in the counterpart Korean Patent Application No. 10-2005-0027872.

International Search Report (PCT/ISA/210) issued on Mar. 22, 2006 in the International Patent Application No. PCT/KR2005/004543.

\* cited by examiner

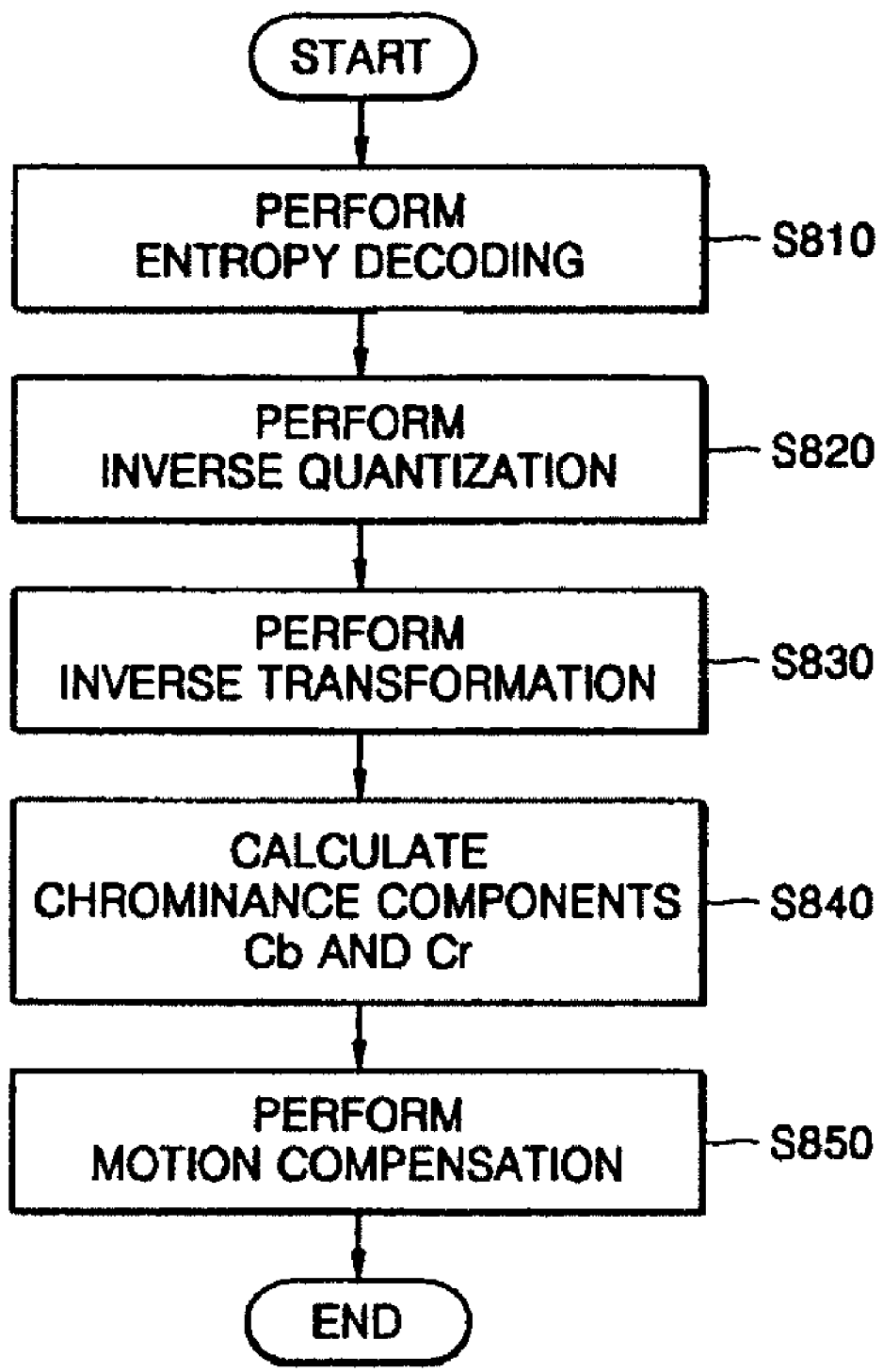

FIG. 9

| INTER-PREDICTION MODE | CONVERSION VALUE 1 | CONVERSION VALUE 2 |
|---|---|---|
| 0 | Cb | Cr |
| 1 | Cb | Cb' − Cr |
| 2 | Cb | Cb' + Cr |
| 3 | Cr | Cb − Cr' |
| 4 | Cr | Cb + Cr' |

FIG. 10

| INTER-PREDICTION MODE | Cb | Cr |
|---|---|---|
| 0 | CONVERSION VALUE 1 | CONVERSION VALUE 2 |
| 1 | CONVERSION VALUE 1 | CONVERSION VALUE 1 − CONVERSION VALUE 2 |
| 2 | CONVERSION VALUE 1 | CONVERSION VALUE 2 − CONVERSION VALUE 1 |
| 3 | CONVERSION VALUE 1 + CONVERSION VALUE 2 | CONVERSION VALUE 2 |
| 4 | CONVERSION VALUE 2 − CONVERSION VALUE 1 | CONVERSION VALUE 2 |

# COLOR IMAGE ENCODING AND DECODING METHOD AND APPARATUS USING A CORRELATION BETWEEN CHROMINANCE COMPONENTS

This patent application is a divisional of U.S. patent application Ser. No. 11/219,735, filed on Sep. 7, 2005, which claims priority from Korean Patent Application Nos. 10-2004-0116962, filed on Dec. 30, 2004, and 10-2005-0027827 filed on Apr. 2, 2005, respectively, in the Korean Intellectual Property Office. The entire disclosures of the prior applications are hereby incorporated by reference in their entireties.

BACKGROUND OF THE INVENTION

1. Field of the Invention

Apparatuses and methods consistent with the present invention relate to encoding and decoding of color image data, and more particularly, to encoding and decoding color image data having a YCbCr format into a smaller amount of data by searching for a correlation between chrominance components Cb and Cr of the color image data.

2. Description of Related Art

FIG. 1 is a diagram illustrating data constituting video having an RGB format and video having an YCbCr format.

The RGB format represents color video, divides a chrominance component of the color video into red (R), green (G), and blue (B) chrominance components, and represents the R, G, and B chrominance components. Here, the R, G, and B chrominance components have the same amount of data. For example, when a macroblock has a size of 16×16, the R, G, and B chrominance components have sizes of 16×16. However, the human eye is more sensitive to luminance components representing brightness than chrominance components representing colors. Thus, a format in which color video is divided into luminance and chrominance components to be represented may be used to reduce an amount of data. The YCbCr format is such a format.

In the YCbCr format, a larger amount of data is allocated to luminance components than chrominance components. Referring to FIG. 1, when the RGB format video of the 16×16 macroblock is represented as the YCbCr format video in the 16×16 macroblock, the RGB format video is represented as a 16×16 luminance block and 8×8 chrominance blocks Cb and Cr. Here, values of a luminance component Y and chrominance components Cb and Cr are calculated through weighted combinations of R, G, and B values. For example, the values of the luminance component Y and the chrominance components Cb and Cr are calculated using equations such as $Y=0.29900R+0.58700G+0.11400B$, $Cb=-0.16874R-0.33126G+0.50000B$, and $Cr=0.50000R-0.41869G-0.08131B$. As described above, color motion picture data having an YCbCr format includes a luminance component and two chrominance components. When the color motion picture data is encoded, the luminance component and the two chrominance components are separately encoded. In other words, the luminance component and the two chrominance components are encoded regardless of correlation between the two chrominance components.

FIG. 2 is a diagram of structures of color video data in 4:4:4, 4:2:2, and 4:2:0 formats.

When a motion picture is encoded, a color format of the motion picture is represented by a rate of a luminance component and chrominance components of pixels of the motion picture in a horizontal pixel line. Hereinafter, the luminance component is denoted Y, and the chrominance components are denoted Cb and Cr. The luminance (brightness) of one pixel is represented with eight bits in the ITU-R Recommendation, and the chrominance (color) of a pixel is represented with two chrominance components Cb and Cr each having eight bits. A coordinate system for representing colors is called a color space. In the Motion Picture Experts Group (MPEG) standards, a color format of a motion picture is represented using three 8-bit pieces of information, i.e., a luminance component Y and chrominance components Cb and Cr.

When a color motion picture is represented using a luminance component Y and chrominance components Cb and Cr, several types of color formats can be represented according to the rate of the luminance component Y and the chrominance components Cb and Cr. In the case of different color formats, luminance components Y of the different color formats are the same, but chrominance components Cb and Cr of the different color formats vary. Referring to FIG. 2, video having a 4:2:2 format is obtained by ½ downsampling chrominance components of a video having a 4:4:4 format in a horizontal direction, and video having a 4:2:0 format is obtained by ½ downsampling chrominance components of the video having the 4:2:2 format in a vertical direction.

As described above, in a conventional codec (MPEG, H.26x, VC1), RGB color video is converted into YCbCr color video to separate a luminance component and chrominance components from the YCbCr color video so on separately encode the luminance component and the chrominance components. Here, color video may have several different formats, such as 4:4:4, 4:2:2, and 4:2:0 formats, etc. In general, the conventional codec (MPEG, H.26x, VC1) receives video data having the 4:2:0 format to encode a luminance component Y and chrominance components Cb and Cr. An example of video data having the 4:2:0 format will now be described.

In a general method of encoding a motion picture, a luminance component Y and chrominance components Cb and Cr are encoded so as not to have temporal and spatial redundancies. The spatial redundancy is removed through intra-prediction between a neighboring block and a current block, and the temporal redundancy is removed through inter-prediction between a previous picture and a current picture. Here, only a difference component between the neighboring block and the current block, and only a difference component between the previous picture and the current picture, are encoded through the intra-prediction, so on improve compression efficiency.

In other words, only predictions for removing the temporal and spatial redundancies of the luminance component Y and the chrominance components Cb and Cr are performed. Redundancy removal using a correlation between the luminance component Y and the chrominance components Cb and Cr is not performed. However, when compressing high quality video such an H.264 high profile, the amount of data of the luminance component Y and the chrominance components Cb and Cr increases. Thus, a method of efficiently compressing high quality video is required.

SUMMARY OF THE INVENTION

The present invention provides a color image encoding and decoding method and apparatus by which a correlation between chrominance components Cb and Cb of color image is searched for and used to reduce an amount of data to be encoded so on improve encoding speed.

According to an aspect of the present invention, there is provided an encoding apparatus including: a chrominance component transformer multiplying chrominance components Cb and Cr of color video by predetermined coefficients, combining the multiplication results to generate a plurality of conversion values, selecting two of the conversion values having lowest costs calculated by a predetermined cost function, and outputting the selected conversion values; and an entropy coder performing entropy coding on the selected conversion values.

The chrominance components Cb and Cr may be transformed and quantized chrominance components. The encoding apparatus may further include a transformer and a quantizer transforming and quantizing the conversion values output from the chrominance component transformer, if the chrominance components Cb and Cr are non-transformed and non-quantized chrominance components.

The chrominance component transformer may calculate the conversion values of the chrominance components Cb and Cr using the equation conversion value=a×Cb+b×Cr+c, wherein a, b and c are constants and a plurality of sets (a, b, c) are predetermined by a user. The predetermined cost function may be any one of a rate-distortion cost function, a sum of absolute difference value function, a sum of absolute transformed difference function, a sum of squared difference function, and a mean of absolute difference function.

The chrominance component transformer may include: a conversion value calculator multiplying the chrominance components Cb and Cr by a plurality of (a, b, c) coefficients, combining the multiplication results, and generating the conversion values; a cost calculator calculating the costs of the conversion values using the predetermined cost function; and a determiner selecting and outputting the two conversion values having the lowest costs.

The chrominance component transformer may run-length code information on (a, b, c) coefficients corresponding to the two conversion values having the two lowest costs.

According to another aspect of the present invention, there is provided an encoding method including: multiplying chrominance components Cb and Cr of color video by predetermined coefficients, combining the multiplication results to generate a plurality of conversion values, selecting two of the conversion values having lowest costs calculated by a predetermined cost function, and outputting the selected conversion values; and performing entropy coding on the selected conversion values.

Multiplying the chrominance components Cb and Cr of the color video by the predetermined coefficients, combining the multiplication results to generate the plurality of conversion values, selecting the two of the conversion values having the lowest costs calculated by the predetermined cost function, and outputting the selected conversion values may include: multiplying the chrominance components Cb and Cr by a plurality of (a, b, c) coefficients, combining the multiplication results, and generating the conversion values; calculating the costs of the conversion values using the predetermined cost function; and selecting and outputting the two conversion values having the lowest costs.

Information on (a, b, c) coefficients corresponding to the two conversion values having the two lowest costs may be run-length coded.

According to still another aspect of the present invention, there is provided a decoding apparatus including: an entropy decoder entropy-decoding an encoded bitstream; and a chrominance component inverse transformer bypassing the decoded data if the decoded data is a luminance component, and extracting information on coefficients by which chrominance components Cb and Cr are multiplied and combined, in order to generate and output original chrominance components Cb and Cr if the decoded data is chrominance components.

The chrominance component inverse transformer may extract information indicating which set of (a, b, c) coefficients are used to encode the chrominance components, in order to calculate the chrominance components Cb and Cr, the information being run-length coded and transmitted.

According to yet another aspect of the present invention, there is provided a decoding method including: entropy-decoding an encoded bitstream; and bypassing the decoded data if the decoded data is a luminance component, and extracting information on coefficients by which chrominance components Cb and Cr are multiplied and combined, in order to generate and output original chrominance components Cb and Cr if the decoded data is chrominance components.

According to yet another aspect of the present invention, there is provided an encoding apparatus for a color image, including: a chrominance component transformer transforming chrominance components of a color image in each of two or more inter-prediction modes, calculating costs for the conversion values in each of the two or more inter-prediction modes using a predetermined cost function, selecting one of the two or more inter-prediction modes based on the calculation result, and outputting conversion values of the selected inter-prediction mode; and an entropy encoder entropy encoding the output conversion values.

The selection of one of the two or more inter-prediction modes may be performed in the unit of a predetermined macroblock. Here, information on the inter-prediction mode selected for the predetermined macroblock may be coded in the unit of a predetermined group comprising a plurality of blocks.

The information on the inter-prediction mode for the plurality of blocks of the predetermined group may be classified into a plurality of mode planes, and the plurality of mode planes are coded.

The plurality of mode planes may include information on whether an inter-prediction mode corresponding to a current mode plane is applied to each of the plurality of blocks.

A predetermined mode plane may be obtained by setting mode information corresponding to a block to which the inter-prediction mode corresponding to the current mode plane is applied to "1" and mode information corresponding to a block to which the inter-prediction mode corresponding to the current mode plane is not applied to "0."

Inter-prediction mode information for the plurality of blocks of the predetermined group may be classified into a plurality of mode planes in each mode, the plurality of mode planes may be arranged in a determined order, information on a next mode plane may be transformed based on mode information on a previous mode plane, and the transformed mode plane may be coded.

The plurality of mode planes may include information on whether an inter-prediction mode corresponding to a current mode plane is applied to each of the plurality of blocks, and the next mode plane may be transformed by deleting information on a block to which an inter-prediction mode of the previous mode plane is applied from information on the next mode plane based on information on the previous mode plane.

A predetermined mode plane may be obtained by setting mode information corresponding to a block to which the inter-prediction mode corresponding to the current mode plane is applied to "1" and mode information corresponding to a block to which the inter-prediction mode corresponding to the current mode plane is not applied to "0."

The deletion of the information on the block to which the inter-prediction mode of the previous mode plane is applied may be achieved by setting the information on the block to "0."

The plurality of blocks may be macroblocks, and the predetermined group may be a picture.

The chrominance component transformer may include: an inter-prediction mode table storage storing an inter-prediction mode table comprising two or more inter-prediction modes; a conversion value calculator calculating conversion values of chrominance components Cb and Cr of a color image in each mode based on the inter-prediction mode table; and a mode selector selecting an inter-prediction mode in which the conversion values have the lowest costs calculated by a predetermined cost function.

The encoding apparatus may further include a run-length coder run-length coding information on the selected inter-prediction mode.

According to yet another aspect of the present invention, there is provided an encoding method for a color image, including: transforming chrominance components of a color image in each of two or more inter-prediction modes, calculating costs for the conversion values in each of the two or more inter-prediction modes using a predetermined cost function, selecting one of the two or more inter-prediction modes based on the calculation result, and outputting conversion values of the selected inter-prediction mode; and entropy encoding the output conversion values.

According to yet another aspect of the present invention, there is provided a decoding apparatus for an encoded color image, including: an entropy decoder entropy decoding an input bitstream; and a chrominance component inverse transformer recovering original chrominance components based on inter-prediction mode information applied to a current block having a predetermined size, the inter-prediction mode information being extracted from the input bitstream. Here, the inter-prediction mode information may indicate the inter-prediction mode of two or more inter-prediction modes applied to the current block, and the original chrominance components may be obtained from conversion values corresponding to the inter-prediction mode applied to the current block.

According to yet another aspect of the present invention, there is provided a decoding method for a color image, including: entropy decoding an input bitstream; and recovering original chrominance components based on inter-prediction mode information applied to a current block having a predetermined size, the inter-prediction mode information being extracted from the input bitstream. Here, the inter-prediction mode information may indicate the inter-prediction mode of two or more inter-prediction modes applied to the current block, and the original chrominance components may be obtained from conversion values corresponding to the inter-prediction mode applied to the current block.

According to yet another aspect of the present invention, there is provided a computer-readable recording medium having embodied thereon a computer program for the encoding method.

According to yet another aspect of the present invention, there is provided a computer-readable recording medium having embodied thereon a computer program for the decoding method of claim.

BRIEF DESCRIPTION OF THE DRAWINGS

The above and/or other aspects of the present invention will become more apparent by describing in detail exemplary embodiments thereof with reference to the attached drawings in which:

FIG. 8 is a flowchart of a decoding method according to an exemplary embodiment of the present invention;

FIG. 9 is a table showing an inter-prediction mode according to an exemplary embodiment of the present invention;

FIG. 10 is a table illustrating an inverse inter-prediction method with respect to each inter-prediction mode;

FIGS. 13A through 13E are views showing inter-prediction mode planes according to an exemplary embodiment of the present invention;

FIGS. 14A through 14D are views illustrating a method of coding inter-prediction mode information according to an exemplary embodiment of the present invention;

DETAILED DESCRIPTION OF EXEMPLARY EMBODIMENTS OF THE INVENTION

Hereinafter, exemplary embodiments of the present invention will be described in detail with reference to the attached drawings.

Figure 1:
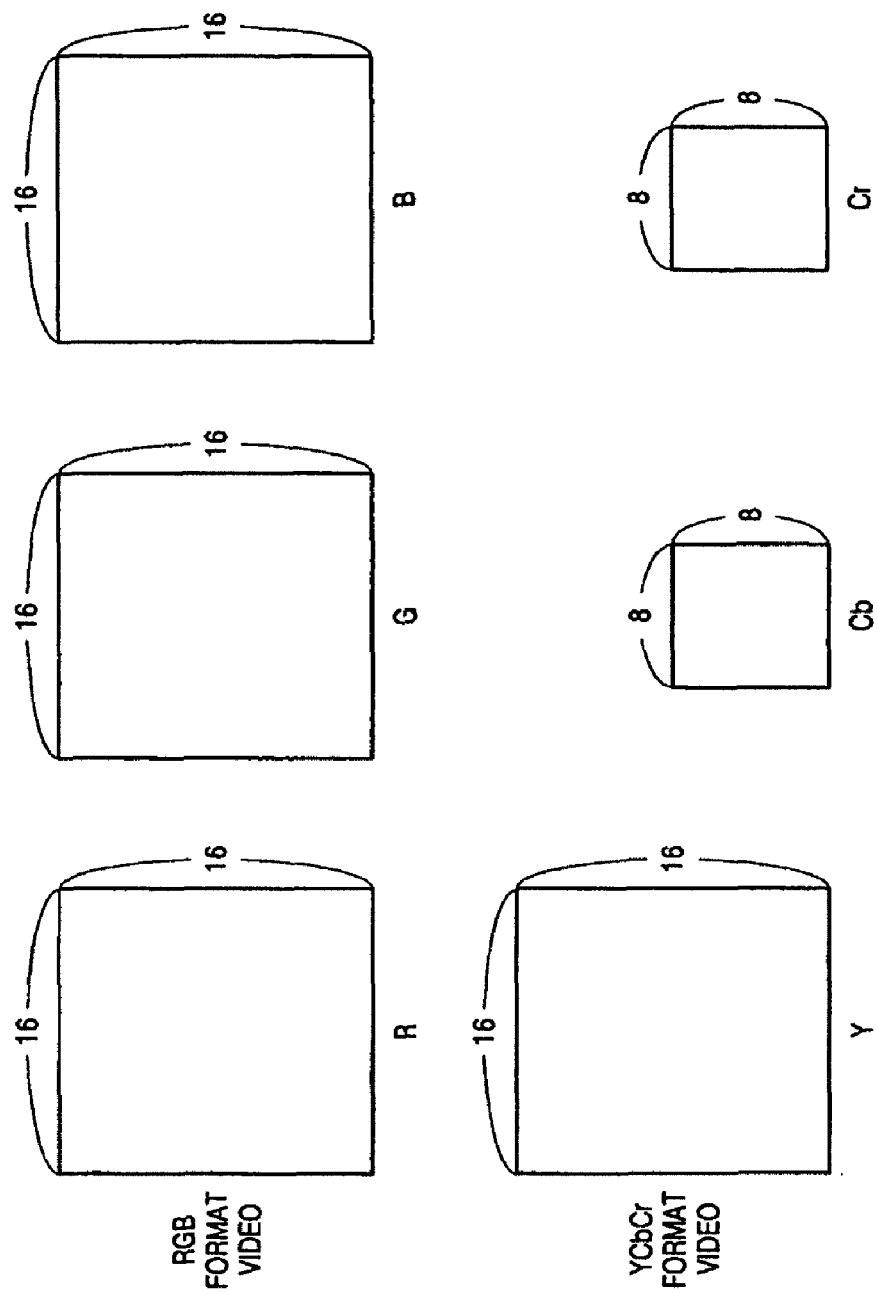
FIG. 1 is a diagram of data constituting video having an RGB format and video having an YCbCr format.
Figure 2:
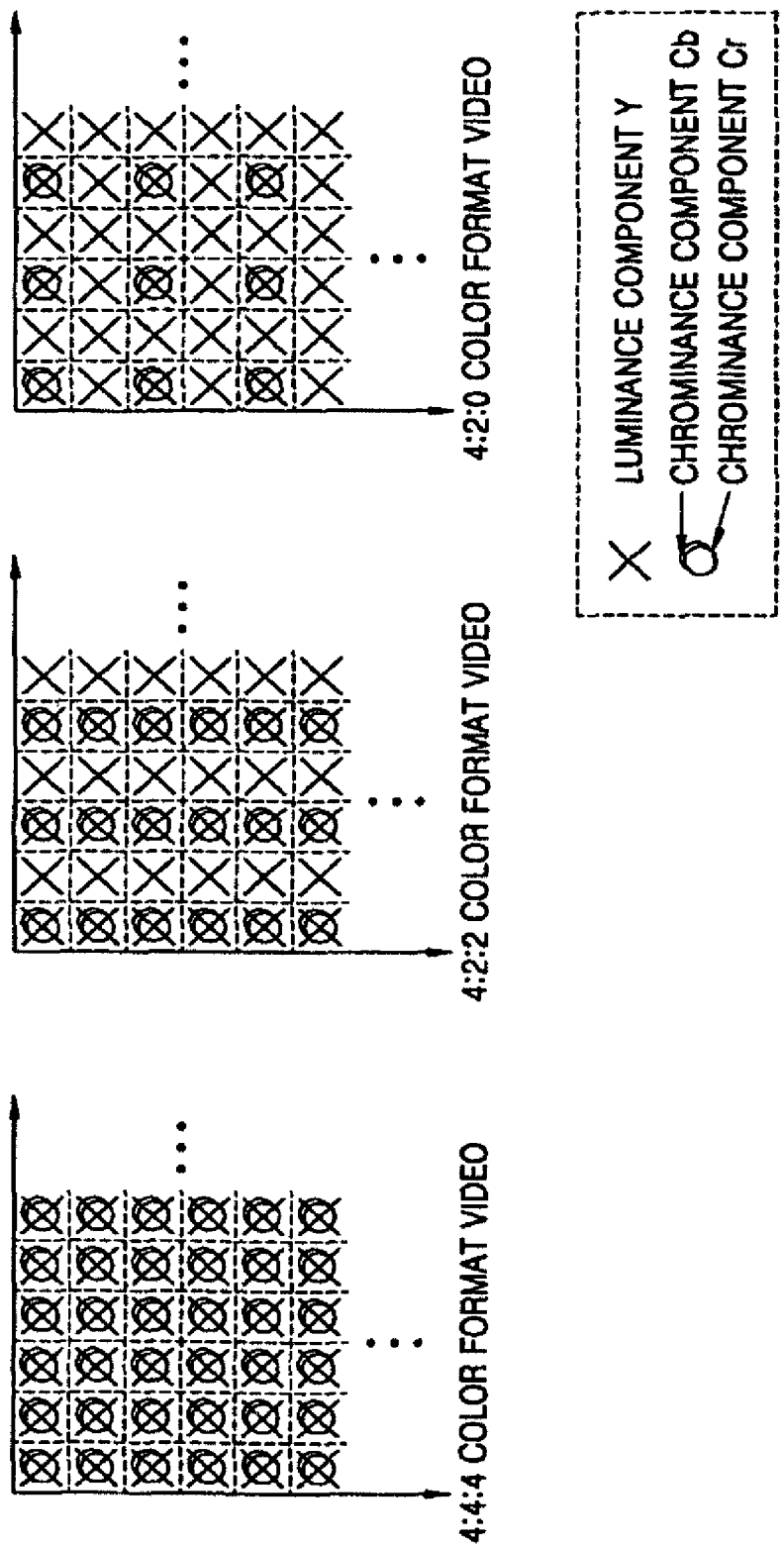
FIG. 2 is a diagram of structures of video data having 4:4:4, 4:2:2, and 4:2:0 formats.
Figure 3:
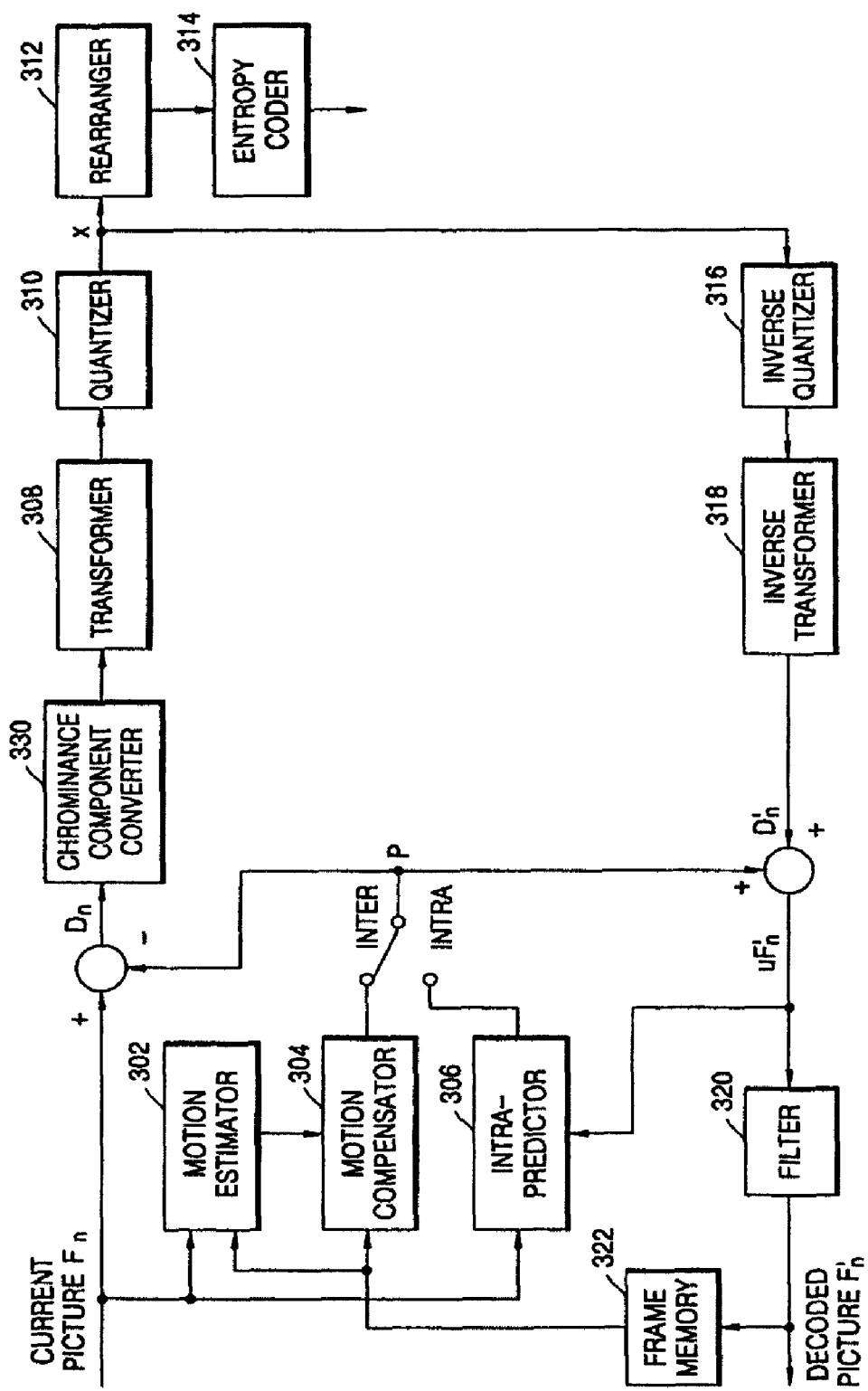
FIG. 3 is a block diagram of an apparatus for encoding a motion picture according to an exemplary embodiment of the present invention.

FIG. 3 is a block diagram of an apparatus for encoding a motion picture according to an exemplary embodiment of the present invention. The apparatus includes a motion estimator 302, a motion compensator 304, an intra-predictor 306, a transformer 308, a quantizer 310, a rearranger 312, an entropy coder 314, an inverse quantizer 316, an inverse transformer 318, a filter 320, and a frame memory 322.

The apparatus encodes macroblocks of a current picture in one of a plurality of encoding modes. For this purpose, the apparatus performs encoding in modes in which inter-prediction and intra-prediction are performed to calculate rate-distortion costs (RDCosts). The apparatus determines a mode in which a lowest RDCost is calculated as an optimal mode and performs encoding in the optimal mode. Here, the rate (R) indicates a bit rate which is a number of bits used for encoding one macroblock. Specifically, R is a value obtained by adding a number of bits obtained by encoding a residual signal generated after the inter-prediction or the intra-prediction is performed and a number of bits obtained by encoding motion vector. The distortion (D) indicates a difference between an original macroblock of video and a decoded macroblock of video. Thus, D is a value obtained by decoding the original macroblock.

However, the determination of the optimal encoding mode may be made using various methods as well as the calculation of the RDCosts. In other words, calculation of the RDCosts and other costs may also be performed using various methods. For example, examples of a usable cost function include a sum of absolute difference value (SAD), a sum of absolute transformed difference (SATD), a sum of squared difference (SSD), a mean of absolute difference (MAD), a Lagrange function, and the like.

For the inter-prediction, the motion estimator 302 searches a reference picture for an estimation value of a macroblock of a current picture. The motion compensator 304 calculates an intermediate pixel value of reference blocks searched in ½ or ¼ pixel units to determine a reference block data value. Therefore, the motion estimator 302 and the motion compensator 304 perform the inter-prediction.

The intra-predictor 306 performs the intra-prediction for searching the current picture for the estimation value of the macroblock of the current picture. A determination is made on whether the inter-prediction or the intra-prediction is performed with respect to a current macroblock by determining an encoding mode in which the lowest of the RDCosts is calculated as an encoding mode of the current macroblock, so on encode the current macroblock.

As described above, if estimation data to which a macroblock of a current frame is to refer is searched by performing the inter-prediction or the intra-prediction, the estimation data is subtracted from the macroblock of the current picture, and then the subtraction result is input to a chrominance component transformer 330. The chrominance component transformer 330 receives chrominance components, converts the chrominance components into various conversion values according to a chrominance component conversion method that will be described later, and selects two of the various conversion values. In a case where the chrominance component transformer 330 receives a luminance component, the chrominance component transformer 330 passes the luminance component. The luminance component or the selected chrominance components are input to and transformed by the transformer 308 and then quantized by the quantizer 310. The result of subtracting a motion estimated reference block from the macroblock of the current frame is called a residual. Data input to the chrominance component transformer 330 to reduce the amount of data during encoding is a residual value. The quantized residual value passes through the rearranger 312 and is encoded by the entropy encoder 314.

A quantized picture is decoded into the current picture by the inverse quantizer 316 and the inverse transformer 318 to obtain a reference picture to be used for the inter-prediction. The decoded current picture is stored in a frame memory to be used for inter-prediction of a next picture. When the decoded picture passes through the filter 320, the decoded picture becomes an original picture including a few encoding errors.

The operation of the chrominance component transformer 330 will now be described in detail. When the chrominance component transformer 330 receives chrominance components Cb and Cr, the chrominance component transformer 330 calculates a conversion value using Equation 1:

$$\text{Conversion Value} = a \times Cb + b \times Cr + c \quad (1)$$

wherein a, b and c may be determined experimentally. For example, if (a, b, c) is (1, 0, 0), (0, 1, 0), (−1, 1, 0), or (1, 1, 0), the conversion value is Cb, Cr, −Cb+Cr, or Cb+Cr. Costs for Cb, Cr, −Cb+Cr, and Cb+Cr are calculated. Calculation of the costs and cost functions used are as described above. Two sets of (a, b, c) having the lowest value of the calculated costs are selected and then input to the transformer 308. For example, if Cb and −Cb+Cr are selected, the transformer 308 converts Cb and −Cb+Cr components. In this case, the cost is the lowest. Thus, values of Cb and −Cb+Cr are the lowest, and thus a bit rate required for encoding is low. In the case of a macroblock in the intra-prediction, (a, b, c) may be (−1, 1, 14), (1, 1, −250), (1, 0, 14), or (0, 1, 14). Even in the case of the macroblock in the intra-prediction, costs for a pair of coefficients of (a, b, c) are calculated, and chrominance components determined by (a, b, c) for which the cost is the lowest are searched for and encoded.

The chrominance component transformer 330 may be positioned after the transformer 308 and the quantizer 310. That is, costs are calculated using frequency transformed chrominance components Cb and Cr in a frequency domain, instead of a spatial domain, to perform rearrangement and entropy encoding.

Figure 4:
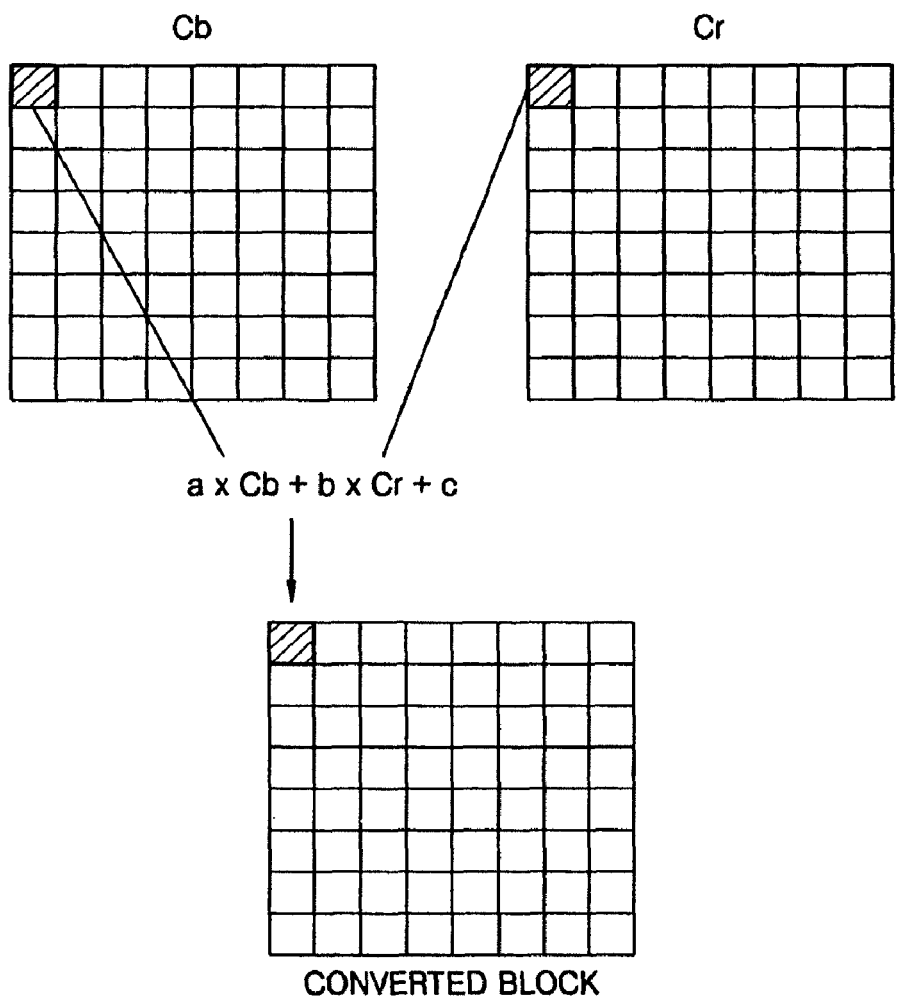
FIG. 4 is a diagram illustrating a calculation of chrominance component conversion values according to an exemplary embodiment of the present invention.

FIG. 4 is a diagram illustrating calculation of chrominance component conversion values according to an exemplary embodiment of the present invention. Referring to FIG. 4, one pixel value is read from each of blocks Cb and Cr and multiplied by or added to (a, b, c) using Equation 1 above to calculate conversion values.

Figure 5:
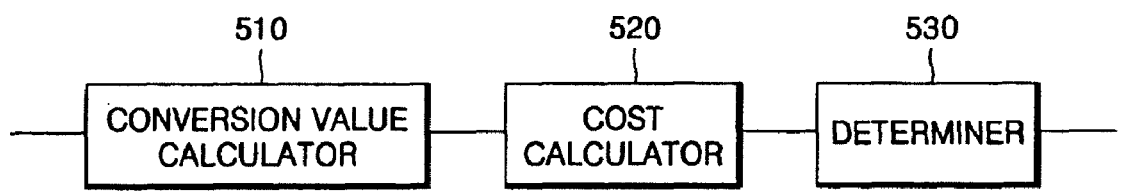
FIG. 5 is a block diagram of a chrominance component transformer 330 shown in FIG. 3.

FIG. 5 is a block diagram of the chrominance component transformer 330 shown in FIG. 3.

The chrominance component transformer 330 includes a conversion value calculator 510, a cost calculator 520, and a determiner 530. When the chrominance components Cb and Cr are input, the conversion value calculator 510 calculates conversion values of all cases that may be obtained from coefficient sets of (a, b, c) using Equation 1 above. The cost calculator 520 calculates costs for the conversion values. The determiner 530 selects the two lowest of the costs to output conversion values having the two lowest costs.

Figure 6:
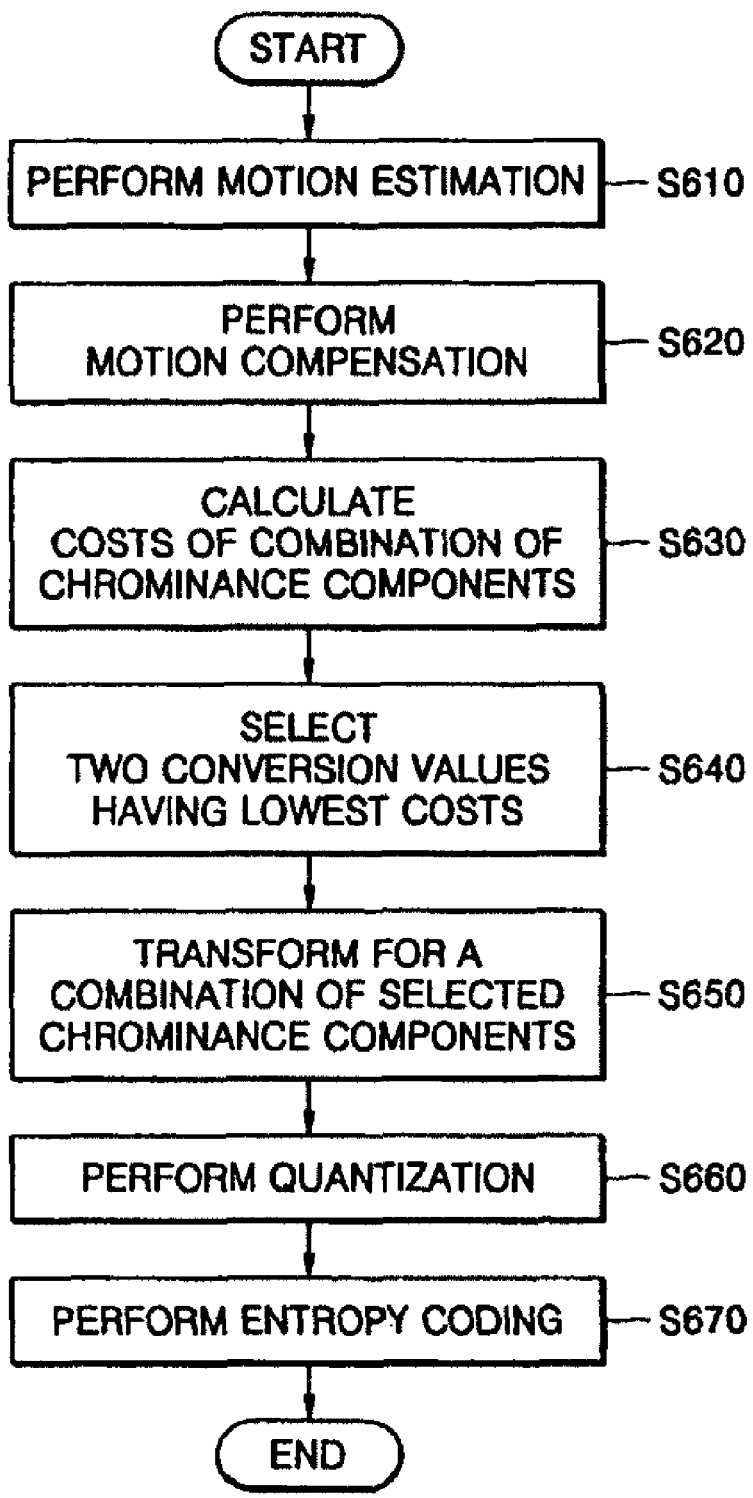
FIG. 6 is a flowchart of an encoding method according to an exemplary embodiment of the present invention.

FIG. 6 is a flowchart of an encoding method according to an exemplary embodiment of the present invention.

When video data is input, in operations S610 and S620, motion estimation and motion prediction are performed in a case of inter-prediction. In a case of intra-prediction, motion estimation and motion prediction are omitted. Here, motion estimation and motion prediction are performed as described with reference to FIG. 3. In operation S630, costs of all cases are calculated using predetermined coefficients (a, b, c) as described above with reference to FIGS. 4 and 5. In operation S640, the two lowest values of the costs are selected. In operations S650, S660, and S670, the two lowest values are transformed, quantized, and entropy coded, respectively. Conventionally, the chrominance components Cb and Cr are encoded using such a method. However, in the present invention, in operations S630 and 640, redundancy between the chrominance components Cb and Cr is removed before encoding to reduce the number of bits required for encoding.

The selected (a, b, c) coefficient information is encoded and transmitted. Selected coefficient information for each macroblock is recorded in a picture header to indicate which chrominance components of each macroblock are encoded and transmitted. In the above-described inter-prediction, if first and third coefficients of coefficients (1, 0, 0), (0, 1, 0), (−1, 1, 0), and (1, 1, 0) are selected, run-length coding is performed on the first and third coefficients.

In more detail, run-length coding is performed on selected coefficient information only when a chrominance component block is encoded. Here, a conventional syntax chrominance encoding block pattern or a coded block pattern for chrominance (CBPC) may be used. When run-length coding is performed, a number of bits allocated to "run" varies depending on how many sets are used, and a number of bits allocated to "length" varies depending on how much continuous run is coded into one. For example, in a case where a number of sets is four, i.e., S1, S2, S3, and S4, a number of bits allocated to "run" is two bits, and a number of bits allocated to "length" is five bits, one (run, length) is coded into seven bits. Thus, if S1 is consecutively output eleven times, (S1, 10) is coded into "0001010." Since selected (a, b, c) coefficient information of each macroblock is highly likely to have a similar value to coefficient information of a neighboring macroblock, run-length coding may be used to reduce the number of bits required for encoding. In addition, by using the chrominance encoding block pattern or CBPC, information for indicating whether a chrominance block is coded, in units of blocks, is transmitted.

The (a, b, c) coefficient information selected for each macroblock is highly likely to be similar for the neighboring macroblock. Thus, run-length coding may be used to reduce the number of bits required for encoding.

Figure 7:
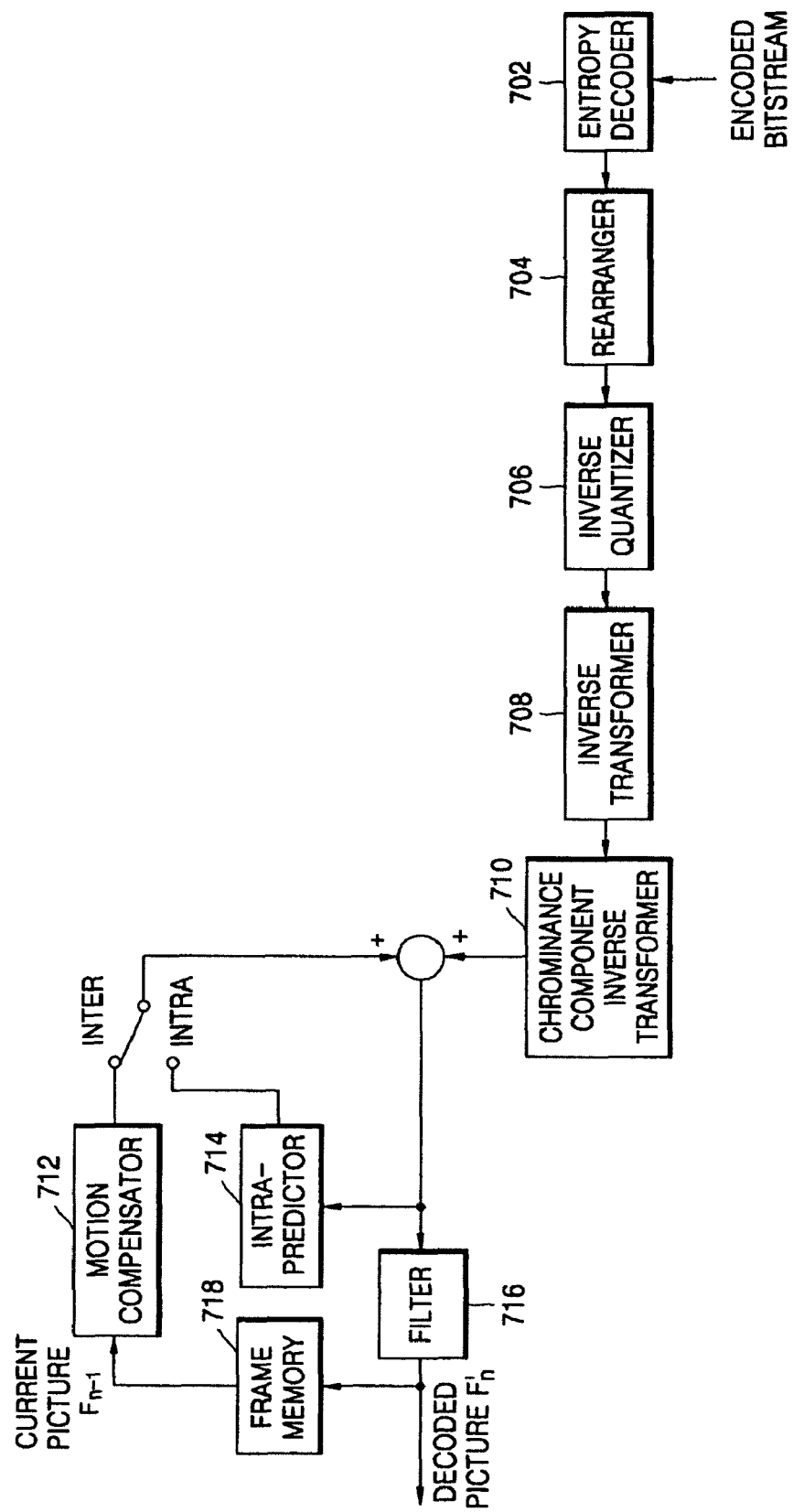
FIG. 7 is a block diagram of a decoding apparatus according to an exemplary embodiment of the present invention.

FIG. 7 is a block diagram of a decoding apparatus according to an exemplary embodiment of the present invention. Referring to FIG. 7, the decoding apparatus includes an entropy decoder 702, a rearranger 704, an inverse quantizer 706, an inverse transformer 708, a chrominance component inverse transformer 710, a motion compensator 712, an intra-predictor 714, a filter 716, and a frame memory 718. When an encoded bitstream is input to the decoding apparatus, the encoded bitstream is entropy decoded, rearranged, inverse-transformed, and input to the chrominance component inverse transformer 710. In a case where input data is a luminance component, the luminance component is bypassed. In a case where the input data are chrominance components, the chrominance component inverse transformer 710 determines which coefficients (a, b, c) were used to encode the chrominance components, to thereby generate chrominance components Cb and Cr. Information indicating which coefficients (a, b, c) were used to encode and transmit the chrominance components is also run-length coded and transmitted. Thus, the chrominance component inverse transformer 710 decodes the information to generate the chrominance components Cb and Cr. Alternatively, the chrominance component inverse transformer 710 may be positioned before the inverse quantizer 706 and the inverse transformer 708.

FIG. 8 is a flowchart of a decoding method according to an exemplary embodiment of the present invention.

In operation S810, entropy decoding is performed. In operation S820, inverse quantization is performed. In operation S830, inverse transformation is performed. In operation S840, received coefficient information (a, b, c) is decoded, a determination is made on which combination of chrominance components Cb and Cr was encoded, in order to inverse-transform the combination and obtain chrominance components Cb and Cr. In operation S850, motion compensation is performed. In the case of the intra-prediction, motion compensation is omitted.

An encoding method according to an exemplary embodiment of the present invention will now be described with reference to FIGS. 9 through 15.

Figures 11, 12:
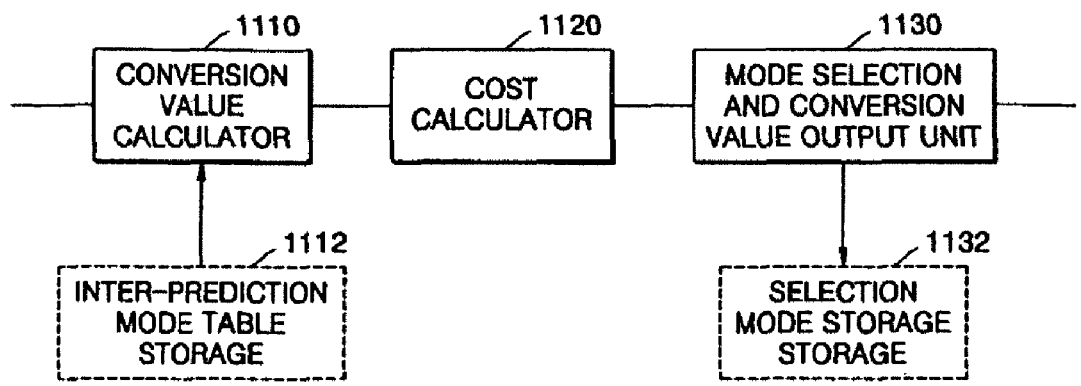
FIG. 11 is a block diagram of the chrominance component transformer 330 shown in FIG. 3 according to an exemplary embodiment of the present invention.
FIG. 12 is a block diagram of an inter-prediction mode selected for each macroblock in one picture.

FIG. 9 is a table showing an inter-prediction mode according to an exemplary embodiment of the present invention. Referring to FIG. 9, five inter-prediction modes, "0" through "4", are set with respect to each macroblock. One of the inter-prediction modes is selected in the unit of macroblock as shown in FIG. 12. Cb and Cr blocks are replaced with conversion values "1" and "2" according to the selected mode and the table shown in FIG. 9. Correlations between conversion values and Cb and Cr values in the inter-prediction modes shown in FIG. 9 are exemplary. Alternatively, modes having other correlations may be added or modes may be removed.

For example, if an inter-prediction mode selected with respect to a predetermined macroblock is "0," the conversion value "1" is a Cb value of the Cb block, and the conversion value "2" is a Cr value of the Cr block. Also, if the selected inter-prediction mode is "1", the conversion value "1" is the Cb value of the Cb block, and the conversion value "2" is a value obtained by subtracting the Cr value of the Cr block from Cb' that is a recovered Cb value. The use of the recovered Cb value and the Cr value in the inter-prediction mode shown in FIG. 9 is to further accurately decode the Cb and Cr values. Alternatively, instead of the recovered Cb and Cr values, original Cb and Cr values may be used. Here, the recovered Cb and Cr values are obtained by converting and quantizing the original Cb and Cr values and then inverse-quantizing and inverse-converting the original Cb and Cr values. The original Cb and Cr values are Cb and Cr values that are not converted and quantized.

FIG. 10 is a table illustrating an inverse inter-prediction mode with respect to the inter-prediction mode. Referring to FIG. 10, if the inverse inter-prediction mode with respect to one macroblock is "0," Cb and Cr values of the corresponding macroblock are obtained from conversion values "1" and "2." If the inverse inter-prediction mode is "1," the Cb value of the corresponding macroblock is obtained from the conversion value "1," but the Cr value is obtained from a value obtained by subtracting a conversion value "2" (Cb'−Cr) from a recovered value Cb' of the conversion value "1." Here, the subtraction of the conversion value "2" from the recovered value Cb' is because the conversion value "2" includes a value Cb'.

FIG. 11 is a block diagram of the chrominance component transformer 330 shown in FIG. 3 according to an exemplary embodiment of the present invention.

The chrominance component transformer 330 includes a conversion value calculator 1110, an inter-prediction mode table storage 1112, a cost calculator 1120, a mode selection and conversion value output unit 1130, and a selection mode storage 1132.

When chrominance components Cb and Cr are input, the conversion value calculator 1110 calculates conversion values "1" and "2" with respect to each inter-prediction mode stored in the inter-prediction mode table storage 1112. For example, the conversion value calculator 1110 generates the conversion values "1" and "2" with respect to each inter-prediction mode shown in FIG. 9. Also, in the present embodiment, the inter-prediction mode table is stored in the conversion value calculator 1110 and the inter-prediction mode table 1112. Alternatively, the inter-prediction mode table may be stored in a predetermined place of the conversion value calculator 1110.

The cost calculator 1120 calculates cost with respect to conversion values calculated in each inter-prediction mode.

The mode selection and conversion value output unit 1130 selects an inter-prediction mode in which conversion values have lowest costs and outputs the conversion values. For example, if the inter-prediction mode "1" is selected according to the inter-prediction mode table shown in FIG. 9, the mode selection and conversion value output unit 1130 outputs Cb and Cb'−Cr values as the conversion values "1" and "2."

The selection mode storage 1132 stores mode information for each macroblock selected by the mode selection and conversion value output unit 1130. The mode information for each macroblock stored in the selection mode storage 1132 is used to generate an inter-prediction mode table in the unit of picture shown in FIG. 12. Also, in the present exemplary embodiment, the mode information for each macroblock is stored in the selection mode storage 1132. However, the mode information for each macroblock may be stored in a predetermined place of the mode selection and conversion value output unit 1132.

The conversion values output from the mode selection and conversion value output unit 1130 are output to the transformer 308 and the quantizer 310 so on be transformed and quantized.

As described above, a conversion value is determined depending on a selected mode. Encoding is performed depending on the determined conversion value. Thus, a decoder must be informed of which inter-prediction mode is selected for each macroblock. A method of transmitting inter-prediction mode information selected for each macroblock will now be described with reference to FIGS. 12 through 14.

FIG. 12 is a view showing an inter-prediction mode selected for each macroblock in one picture. A value in each position is "0", "1", "2", "3", or "4" which indicates an inter-prediction mode applied to each macroblock corresponding to each position. For example, a value "0" in the uppermost and leftmost position indicates that Cb and Cr values of the corresponding macroblock are replaced according to the inter-prediction mode "0" in the table shown in FIG. 9, i.e., the conversion value "1" is Cb and the conversion value "2" is Cr. Values "2" and "2" corresponding to macroblocks next to the macroblock in the uppermost and leftmost position indicate that Cb and Cr values of the corresponding macroblocks are replaced according to the inter-prediction mode "2" shown in FIG. 9, i.e., the conversion value "1" is Cb and the conversion value "2" is Cb'+Cr.

FIGS. 13A through 13E are views showing an inter-prediction mode value of each macroblock shown in FIG. 12 on each inter-prediction mode plane.

FIG. 13A shows a mode 0 plane which is rearranged so that a macroblock indicating the inter-prediction mode "0" in the inter-prediction mode table shown in FIG. 12 has a value "1" and the other macroblocks not indicating the inter-prediction mode "0" have values "0." For example, values of first, fourth, fifth, seventh, eighth, tenth, and fourteenth macroblocks having the inter-prediction mode value "0" in the uppermost position are set to "1," and values of the other macroblocks in the uppermost position are set to "0."

FIG. 13B shows a mode 1 plane which is rearranged so that a macroblock indicating the inter-prediction mode "1" in the inter-prediction mode table shown in FIG. 12 has a value "1," and the other macroblocks not indicating the inter-prediction mode "0" have values "0." For example, values of sixth and ninth macroblocks having the inter-prediction mode value "1" in the uppermost position are set to "1," and the other macroblocks in the uppermost position are set to "0."

FIG. 13C shows a mode 2 plane which is rearranged so that a macroblock indicating the inter-prediction mode "2" in the inter-prediction mode table shown in FIG. 12 has a value "1" and the other macroblocks not indicating the inter-prediction mode "0" have values "0." For example, values of second, third, thirteenth, fifteenth, seventeenth, eighteenth, nineteenth, twentieth, twenty first, and twenty second macroblocks having the inter-prediction mode value "2" in the uppermost position are set to "1," and the other macroblocks in the uppermost position are set to "0."

FIG. 13D shows a mode 3 plane which is rearranged so that a macroblock indicating the inter-prediction mode "3" in the inter-prediction mode table shown in FIG. 12 has a value "1" and the other macroblocks not indicating the inter-prediction mode "0" have values "0." For example, there is no macroblock having the inter-prediction mode value "3" in the uppermost position. Thus, all macroblocks are set to "0."

FIG. 13E shows a mode 4 plane which is rearranged so that a macroblock indicating the inter-prediction mode "4" in the inter-prediction mode table shown in FIG. 12 has a value "1" and the other macroblocks not indicating the inter-prediction mode "0" have values "0." For example, values of eleventh, twentieth, and sixteenth macroblocks having the inter-prediction mode value "4" in the uppermost position are set to "1," and the other macroblocks in the uppermost position are set to "0."

In a case where the inter-prediction mode table shown in FIG. 12 is divided into the mode planes as shown in FIGS. 13A through 13E, the length of 0 run becomes longer.

FIGS. 14A through 14D are views illustrating a method of encoding inter-prediction mode information according to an exemplary embodiment of the present invention. In other words, FIGS. 14A through 14D show mode planes which are transformed so that lengths of one run in the mode planes shown in FIGS. 13A through 13E become longer using a mode plane reduction scheme of the present invention.

FIG. 14A shows a transformed mode 1 plane in which values "0" corresponding to macroblocks having the inter-prediction mode value "1" in the mode 0 plane shown in FIG. 13A are deleted from the mode 1 plane shown in FIG. 13B. As shown in FIG. 14A, 22 bits, "0000010010000000000000", in the uppermost position on the mode 1 plane shown in FIG. 13B are transformed into 15 bits, "001100000000000", in which the values "0" of the first, fourth, fifth, seventh, eighth, tenth, and fourteenth macroblocks having the inter-prediction mode value "1" on the mode 0 plane are removed. The transformed mode 1 plane has a lower bit rate and a longer run than the mode 1 plane.

FIG. 14B shows a transformed mode 2 plane in which the values "0" corresponding to the macroblocks having the inter-prediction mode value "1" on the mode 0 plane and the mode 1 plane are deleted from the mode 2 plane shown in FIG. 13C. As shown in FIG. 14B, 22 bits, "0110000000010101111111", in the uppermost position on the mode 2 plane shown in FIG. 13C are transformed into 13 bits, "1100110111111", in which the values "0" of the first, fourth, fifth, seventh, eighth, tenth, and fourteenth macroblocks having the inter-prediction mode value "1" on the mode 0 plane and the values "0" of the sixth and ninth macroblocks having the inter-prediction mode value "1" on the mode 1 plane are removed. The transformed mode 2 plane has a lower bit rate and a longer run than the mode 2 plane.

FIG. 14C shows a transformed mode 3 plane in which the values "0" corresponding to the macroblocks having the inter-prediction mode value "1" on the mode 0 plane, the mode 1 plane, and the mode 2 plane are deleted from the mode 3 plane shown in FIG. 13D. As shown in FIG. 14C, 22 bits, "0000000000000000000000", in the uppermost position on the mode 3 plane shown in FIG. 13D are transformed into 3 bits, "000", in which the values "0" of the first, fourth, fifth, seventh, eighth, tenth, and fourteenth macroblocks having the inter-prediction mode value "1" on the mode 0 plane, the values "0" of the sixth and ninth macroblocks having the inter-prediction mode value "1" on the mode 1 plane, and the values "0" of the second, third, thirteenth, fifteenth, seventeenth, eighteenth, nineteenth, twentieth, twenty first, and twenty second macroblocks having the inter-prediction mode value "1" on the mode 2 plane are removed. The transformed mode 3 plane has a lower bit rate and a longer run than the mode 3 plane.

FIG. 14D shows a transformed mode 4 plane in which the values "0" corresponding to the macroblocks having the inter-prediction mode value "1" on the mode 0 plane, the mode 1 plane, the mode 2 plane, and the mode 3 plane are deleted from the mode 4 plane shown in FIG. 13E. As shown in FIG. 14D, 22 bits, "0000000000110001000000", in the uppermost position on the mode 4 plane shown in FIG. 13D are transformed into 3 bits, "111", in which the values "0" of the first, fourth, fifth, seventh, eighth, tenth, and fourteenth macroblocks having the inter-prediction mode value "1" on the mode 0 plane, the values "0" of the sixth and ninth macroblocks having the inter-prediction mode value "1" on the mode 1 plane, and the values "0" of the second, third, thirteenth, fifteenth, seventeenth, eighteenth, nineteenth, twentieth, twenty first, and twenty second macroblocks having the inter-prediction mode value "1" on the mode 2 plane are removed. The transformed mode 4 plane has a lower bit rate and a longer run than the mode 4 plane. Also, all values on the transformed mode 4 plane are "1." Thus, encoding is not required in the transformed mode 4 plane.

In the present exemplary embodiment, the mode 0 plane and the transformed mode 1, 2, 3, and 4 planes having the longer run-lengths of "1" may be run-length coded and then transmitted. Thus, an amount of data to be transmitted can be reduced. Alternatively, the mode 0, 1, 2, 3, and 4 planes may be run-length coded and then transmitted.

The decoder decodes the transformed mode 1, 2, 3, and 4 planes shown in FIGS. 14A through 14D to generate the mode 0, 1, 2, 3, and 4 shown in FIGS. 13A through 13E. The decoder also decodes the inter-prediction mode table shown in FIG. 12 based on the decoded mode 0, 1, 2, 3, and 4 planes and decodes the original Cb and Cr values from the conversion values based on the decoded inter-prediction mode table.

Figure 15:
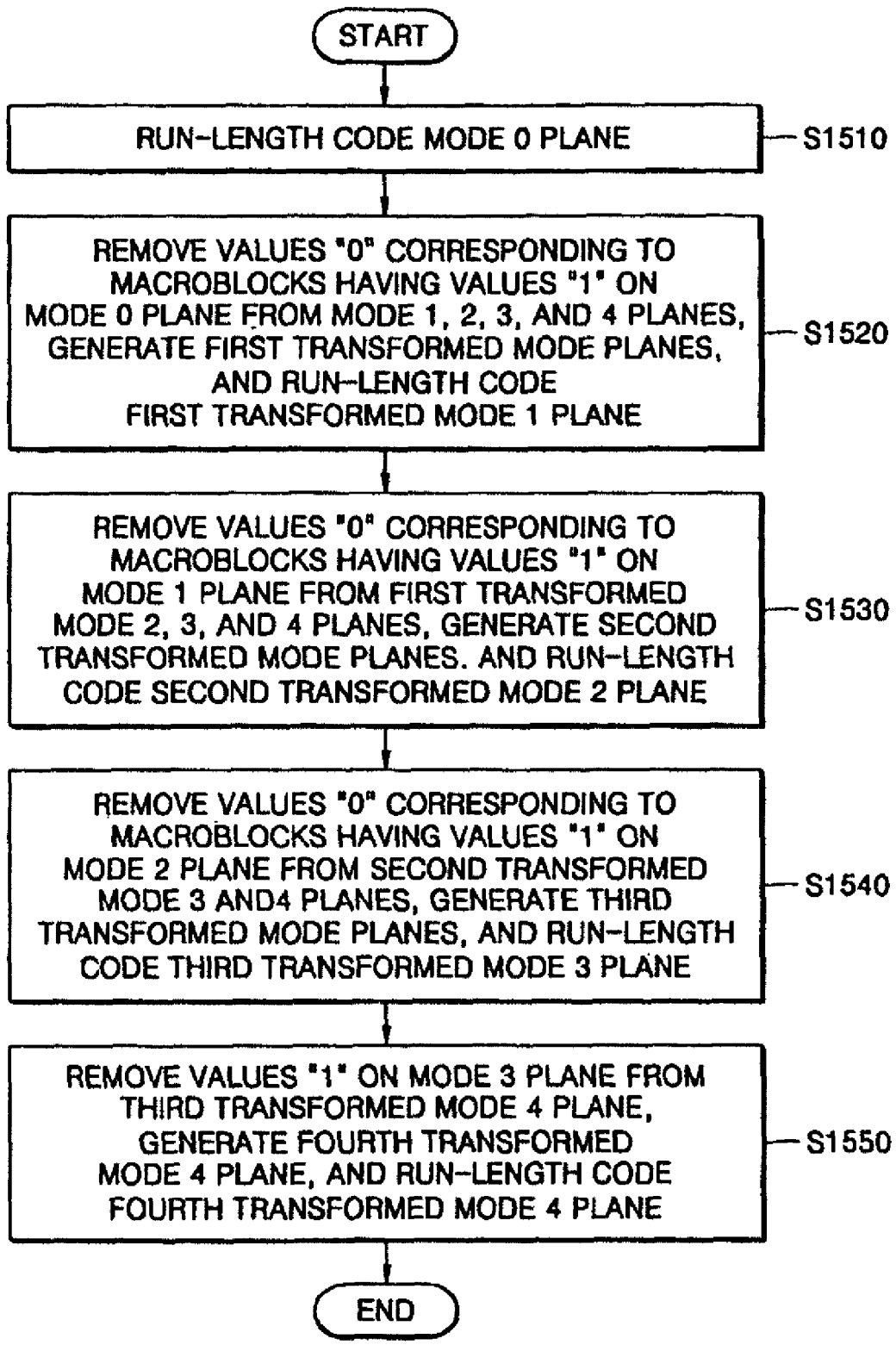
FIG. 15 is a flowchart of a method of coding inter-prediction mode information according to an exemplary embodiment of the present invention.

FIG. 15 is a flowchart of a method of generating the transformed mode 1, 2, 3, and 4 planes shown in FIGS. 14A through 14D and coding inter-prediction mode information according to an exemplary embodiment of the present invention.

In operation S1510, the mode 0 plane is run-length coded.

In operation S1520, the values "0" corresponding to the macroblocks having the values "1" on the mode 0 plane are removed from the mode 1, 2, 3, and 4 planes shown in FIGS. 13B through 13E and the first transformed mode planes are generated. The first transformed mode 1 plane, i.e., the transformed mode 1 plane shown in FIG. 14A, is run-length coded.

In operation S1530, the values "0" corresponding to the macroblocks having the values "1" on the mode 1 plane are removed from the first transformed mode 2, 3, and 4 and second transformed mode planes are generated. The second transformed mode 2 plane, i.e., the transformed mode 2 plane shown in FIG. 14B, is run-length coded.

In operation S1540, the values "0" corresponding to the macroblocks having the values "1" on the mode 2 plane are removed from the second transformed mode 3 and 4 planes and third transformed mode planes are generated. The third transformed mode 3 plane, i.e., the transformed mode 3 plane shown in FIG. 14C, is run-length coded.

In operation S1550, the values "1" on the mode 3 plane are removed from the third transformed mode 4 plane and a fourth transformed mode 4 plane is generated. The fourth transformed mode 4 plane, i.e., the transformed mode 3 plane shown in FIG. 14D, is run-length coded. Values in the last mode plane are "1." Thus, although the transformed mode 4 plane does not include information, original mode planes may be recovered using information of the other transformed mode planes. Therefore, the transformed mode 4 plane may not be additionally coded. Alternatively, operation S1550 may be skipped.

Alternatively, the transformed mode planes may be generated in different order from that in the present exemplary embodiment.

After operations S1510, S1520, S1540, and S1550 are performed, run-length coded inter-prediction information is inserted into a picture header of a bitstream and transmitted.

The inter-prediction using a correlation between chrominance components of a color image, i.e., between Cb and Cr, has been described in the present exemplary embodiment. However, the present invention may be applied between two arbitrary domains in any color space so on improve compression efficiency. For example, the present invention may be applied to an inter-prediction using a correlation between domains in another color space, i.e., between Y and Cb or Y and Cr in an YCbCr color space.

A decoder according to an exemplary embodiment of the present invention will now be described with reference to FIG. 7.

When a coded bitstream is input to the decoder, the bitstream is entropy decoded, rearranged, inverse-transformed, and input into the chrominance component inverse transformer 708. If input data is a luminance component, the input data is bypassed. If the input data is a chrominance component, the input data is input into the chrominance component inverse transformer 710.

An inter-prediction mode determiner (not shown) recovers run-length coded mode planes extracted from the picture header of the input bitstream in the order from the mode 0 plane, generates the inter-prediction mode table in the picture unit shown in FIG. 12, determines an inter-prediction mode applied to each macroblock based on the inter-prediction mode table, and inputs the determined inter-prediction mode into the chrominance component inverse transformer 710.

The chrominance component inverse transformer 710 produces chrominance components Cb and Cr from decoded conversion values using information on the determined inter-prediction mode.

Figure 16:
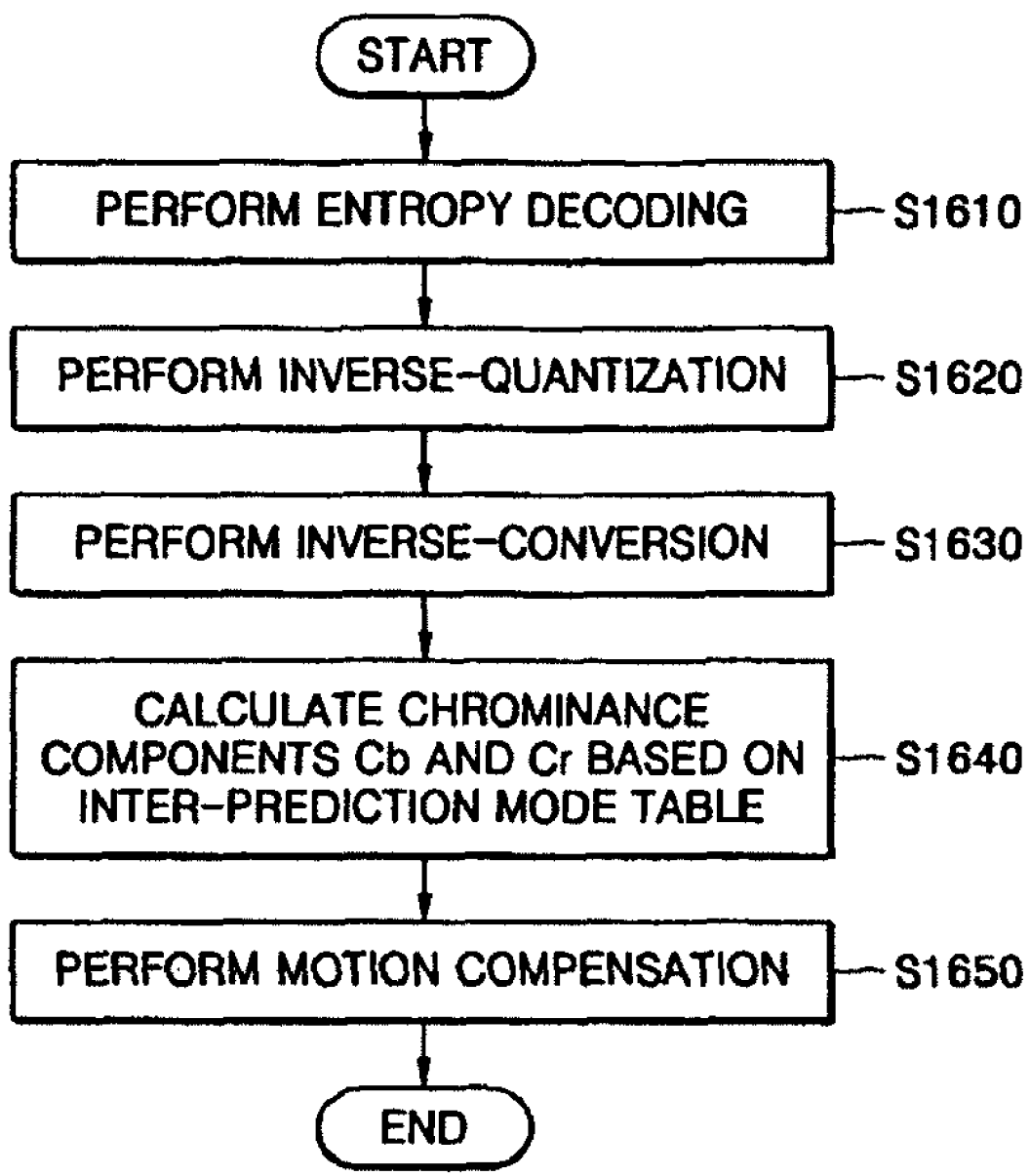
FIG. 16 is a flowchart of decoding method according to an exemplary embodiment of the present invention.

FIG. 16 is a flowchart of a decoding method according to an exemplary embodiment of the present invention.

In operation S1610, entropy decoding is performed. In operation S1620, inverse quantization is performed. In operation 1630, inverse conversion is performed. Thereafter, original mode planes are recovered from the transformed mode planes shown in FIG. 13. An inter-prediction mode table indicating an inter-prediction mode applied to each macroblock in the predetermined unit, e.g., the picture unit.

In operation S1640, an inter-prediction mode applied to a corresponding macroblock is determined from the generated inter-prediction mode table, and decoded conversion values are inverse converted according to the determined inter-prediction mode to calculate the chrominance components Cb and Cr. In operation S1650, motion compensation is performed to perform decoding. In the case of an intra-prediction, operation S1650 is omitted.

As described above, in a color image encoding and decoding method and apparatus using a correlation between chrominance components according to the present invention, a correlation between chrominance components of a motion picture can be found to remove unnecessary components. Thus, motion picture compression efficiency can be improved. In order to remove unnecessary components by searching for the correlation between the chrominance components, coefficient information constituting a combination of chrominance components Cb and Cr can be run-length coded. Thus, the number of bits required for encoding can be greatly reduced. Also, chrominance components Cb and Cr can be transformed in each inter-prediction mode. Information on a mode adopted for the conversion can be divided into mode planes. The mode planes can be run-length coded. As a result, further efficient run-length coding can be achieved.

The above-described encoding and decoding method can be written as a computer program. Codes and code segments of the computer program can be easily inferred by computer programmers skilled in the art to which the present invention pertains. The computer program can be stored in computer-readable media and read and executed by a computer to perform the encoding and decoding method. Examples of the computer-readable media include magnetic recording media, optical recording media, and carrier waves.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A decoding apparatus for decoding an encoded color image, the decoding apparatus comprising:
    an entropy decoder which entropy decodes an input bitstream; and
    a chrominance component inverse transformer which recovers original chrominance components based on inter-prediction mode information applied to a current block having a predetermined size, the inter-prediction mode information being extracted from the input bitstream,
    wherein the inter-prediction mode information indicates an inter-prediction mode which selected from among at least two inter-prediction modes and is applied to the current block, and the original chrominance components are obtained from conversion values corresponding to the inter-prediction mode applied to the current block,
    wherein the inter-prediction mode information extracted from the input bitstream is a plurality of mode planes into which inter-prediction mode information for a plurality of blocks is classified in each mode, and
    wherein the inter-prediction mode information extracted from the input bitstream is a transformed mode plane generated by classifying inter-prediction mode information for the plurality of blocks of the predetermined group into a plurality of mode planes in each mode, arranging the plurality of mode planes in a determined order, and transforming information on a next mode plane based on mode information on a previous mode plane.

2. The decoding apparatus of claim 1, wherein the plurality of mode planes comprise information on whether an inter-prediction mode corresponding to a current mode plane is applied to each of the plurality of blocks.

3. The decoding apparatus of claim 1, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

4. The decoding apparatus of claim 1, wherein the plurality of mode planes comprise information on whether an inter-prediction mode corresponding to a current mode plane is applied to each of the plurality of blocks, and the next mode plane is transformed by deleting information on a block to which an inter-prediction mode of the previous mode plane is applied from information on the next mode plane based on information on the previous mode plane,
    wherein the decoding apparatus decodes the transformed mode planes in the determined order to recover original mode planes.

5. The decoding apparatus of claim 1, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

6. The decoding apparatus of claim 5, wherein the deletion of the information on the block to which the inter-prediction mode of the previous mode plane is applied is achieved by setting the information on the block to "0."

7. The decoding apparatus of claim 1, wherein the current block having the predetermined size is a macroblock, and the mode planes comprise inter-prediction mode information for a macroblock of a picture unit.

8. The decoding apparatus of claim 1, wherein the decoding apparatus extracts inter-prediction mode information coded and transmitted according to a run-length coding method to calculate the chrominance components based on the inter-prediction mode information.

9. The decoding apparatus of claim 1, wherein the chrominance components are Cb and Cr.

10. The decoding apparatus of claim 1, further comprising:
    an inverse quantizer inverse-quantizes decoded data; and
    an inverse transformer which inverse-transforms the decoded data.

11. The decoding apparatus of claim 1, further comprising a motion compensator which performs an inter-prediction.

12. A decoding method for decoding a color image, the decoding method comprising:
    entropy decoding an input bitstream; and
    recovering original chrominance components cased on inter-prediction mode information applied to a current block having a predetermined size, the inter-prediction mode information being extracted from the input bitstream,
    wherein the inter-prediction mode information indicates an inter-prediction mode which is selected from among at least two inter-prediction modes and is applied to the current block, and the original chrominance components are obtained from conversion values corresponding to the inter-prediction mode applied to the current block,
    wherein the inter-prediction mode information extracted from the input bitstream is a plurality of mode planes into which inter-prediction mode information for a plurality of blocks is classified in each mode,
    wherein the inter-prediction mode information extracted from the input bitstream is a transformed mode plane generated by classifying inter-prediction mode information for the plurality of blocks of the predetermined group into a plurality of mode planes in each mode, arranging the plurality of mode planes in a determined order, and transforming information on a next mode plane based on mode information on a previous mode plane.

13. The decoding method of claim 12, wherein the plurality of mode planes comprise information on whether an inter-prediction mode corresponding to a current mode plane is applied to each of the plurality of blocks.

14. The decoding method of claim 12, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

15. The decoding method of claim 12, wherein the plurality of mode planes comprise information on whether an inter-prediction mode corresponding to a current mode plane is applied to each of the plurality of blocks, and the next mode plane is transformed by deleting information on a block to which an inter-prediction mode of the previous mode plane is applied from information on the next mode plane based on information on the previous mode plane,
wherein the transformed mode planes are decoded in the determined order to recover original mode planes.

16. The decoding method of claim 15, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

17. The decoding method of claim 16, wherein the deleting the information on the block to which the inter-prediction mode of the previous mode plane is applied is achieved by setting the information on the block to "0."

18. The decoding method of claim 12, wherein the current block having the predetermined size is a macroblock, and the mode planes comprise inter-prediction mode information for a macroblock of a picture unit.

19. The decoding method of claim 12, wherein inter-prediction mode information coded and transmitted according to a run-length coding method is extracted to calculate the chrominance components based on the inter-prediction mode information.

20. The decoding method of claim 12, wherein the chrominance components are Cb and Cr.

21. The decoding method of claim 12, further comprising inverse-quantizing and inverse-transforming decoded data.

22. The decoding method of claim 12, further comprising performing an inter-prediction.

23. A non-transitory computer-readable recording medium having embodied thereon a computer program for performing a decoding method for decoding a color image, the decoding method comprising:
entropy decoding an input bitstream; and
recovering original chrominance components based on inter-prediction mode information applied to a current block having a predetermined size, the inter-prediction mode information being extracted from the input bitstream,
wherein the inter-prediction mode information indicates an inter-prediction mode which is selected from among at least two inter-prediction modes and is applied to the current block, and the original chrominance components are obtained from conversion values corresponding to the inter-prediction mode applied to the current block,
wherein the inter-prediction mode information extracted from the input bitstream is a plurality of mode planes into which inter-prediction mode information for a plurality of blocks is classified in each mode,
wherein the inter-prediction mode information extracted from the input bitstream is a transformed mode plane generated by classifying inter-prediction mode information for the plurality of blocks of the predetermined group into a plurality of mode planes in each mode, arranging the plurality of mode planes in a determined order, and transforming information on a next mode plane based on mode information on a previous mode plane.

24. The non-transitory computer-readable recording medium of claim 23, wherein, in each of the plurality of mode planes, inter-prediction mode information for a plurality of blocks is classified in each mode.

25. The non-transitory computer-readable recording medium of claim 24 currently amended, wherein the plurality of mode planes comprise information on whether an inter-prediction mode corresponding to a current mode plane is applied to each of the plurality of blocks.

26. The non-transitory computer-readable recording medium of claim 24, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

27. The computer-readable recording medium of claim 24, wherein the inter-prediction mode information extracted from the input bitstream is a transformed mode plane generated by classifying inter-prediction mode information for the plurality of blocks of the predetermined group into a plurality of mode planes in each mode, arranging the plurality of mode planes in a determined order, and transforming information on a next mode plane based on mode information on a previous mode plane.

28. The non-transitory computer-readable recording medium of claim 27, wherein the plurality of mode planes comprise information on whether an inter-prediction mode corresponding to a current mode plane is applied to each of the plurality of blocks, and the next mode plane is transformed by deleting information on a block to which an inter-prediction mode of the previous mode plane is applied from information on the next mode plane based on information on the previous mode plane,
wherein the transformed mode planes are decoded in the determined order to recover original mode planes.

29. The non-transitory computer-readable recording medium of claim 28, wherein a predetermined mode plane is obtained by setting mode information corresponding to a block to which the inter-prediction mode corresponding to the current mode plane is applied to "1" and setting mode information corresponding to a block to which the inter-prediction mode corresponding to the current mode plane is not applied to "0."

30. The non-transitory computer-readable recording medium of claim 29, wherein the deleting the information on the block to which the inter-prediction mode of the previous mode plane is applied is achieved by setting the information on the block to "0."

* * * * *